No. 666,134.  
I. L. FITZ HUGH.  
VALVE MECHANISM.  
(Application filed May 19, 1900.)  
(No Model.)
Patented Jan. 15, 1901.
2 Sheets—Sheet 1.
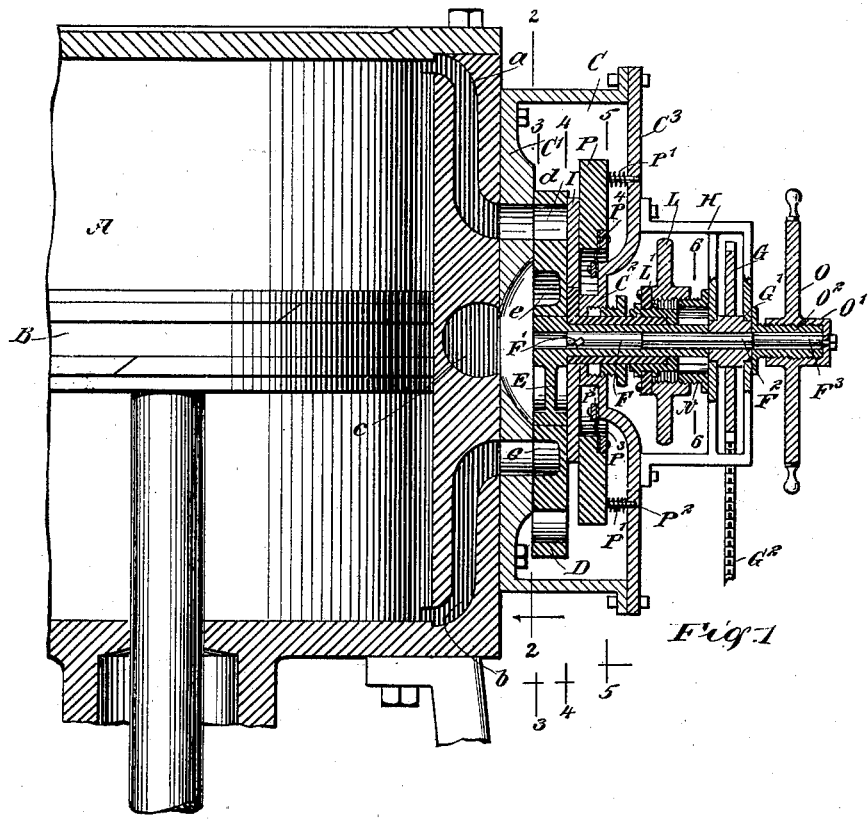
Fig. 1
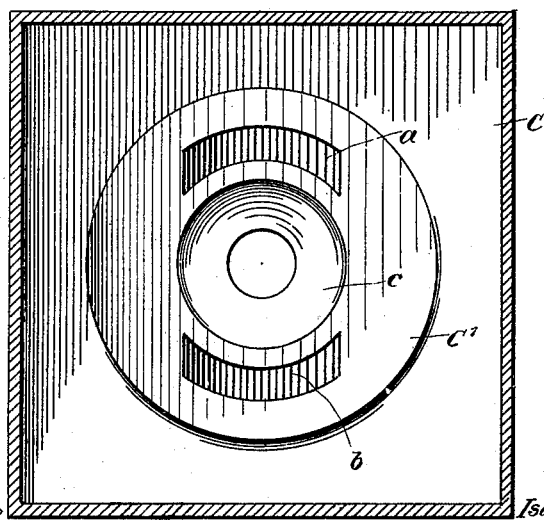
Fig. 2
WITNESSES:
INVENTOR
Isaac L. Fitz Hugh.
BY 
ATTORNEYS No. 666,134. Patented Jan. 15, 1901.
I. L. FITZ HUGH.
VALVE MECHANISM.
(Application filed May 19, 1900.)

(No Model.) 2 Sheets—Sheet 2.

WITNESSES:
John Bergstrom
Thos. J. Hosted

INVENTOR
Isaac L. Fitz Hugh.
BY
ATTORNEYS

THE NORRIS PETERS CO., PHOTO-LITHO., WASHINGTON, D. C.

UNITED STATES PATENT OFFICE.

ISAAC LYNDE FITZ HUGH, OF PICOLATA, FLORIDA.

VALVE MECHANISM.

SPECIFICATION forming part of Letters Patent No. 666,134, dated January 15, 1901.

Application filed May 19, 1900. Serial No. 17,258. (No model.)

*To all whom it may concern:*

Be it known that I, ISAAC LYNDE FITZ HUGH, a citizen of the United States, and a resident of Picolata, in the county of St. John's and State of Florida, have invented a new and Improved Valve Mechanism, of which the following is a full, clear, and exact description.

The invention relates to rotary valves for steam and other engines; and its object is to provide a new and improved valve mechanism which is simple and durable in construction, very effective in operation, composed of but few parts, not liable to get out of order, and arranged to permit the operator to conveniently and quickly change the valve to any desired point of cut-off or to reverse the engine whenever necessary.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 3:
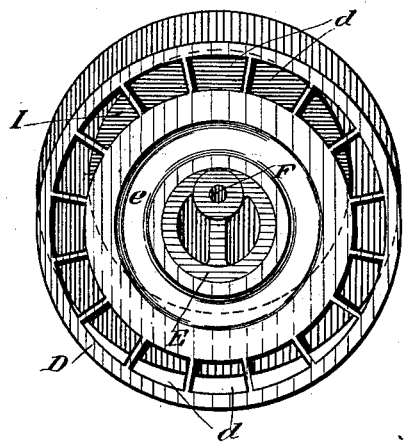
Figure 4:
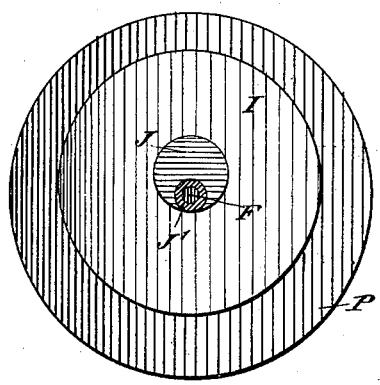
Figure 10:
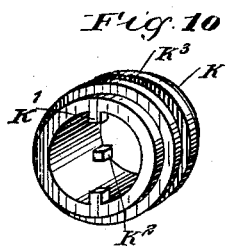
Figure 5:
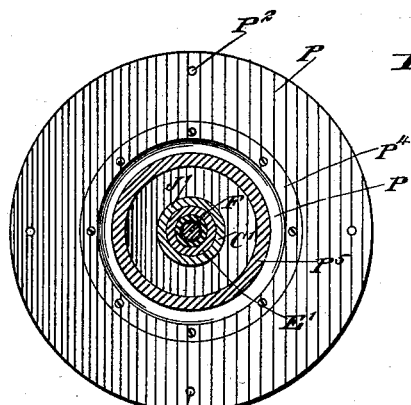
Figure 7:
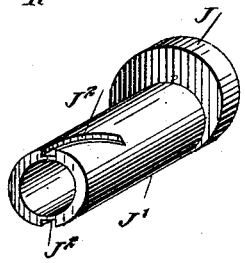
Figure 6:
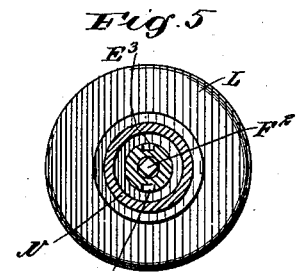
Figure 8:
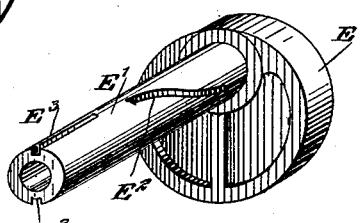
Figure 9:

Figure 1 is a sectional side elevation of the improvement as applied. Fig. 2 is a face view of the valve-seat in the steam-chest, the latter being shown in section on the line 2 2 in Fig. 1. Fig. 3 is a transverse section of the improvement on the line 3 3 in Fig. 1. Fig. 4 is a similar view of the same on the line 4 4 in Fig. 1. Fig. 5 is a like view of the same on the line 5 5 in Fig. 1. Fig. 6 is a similar view of the same, on the line 6 6 in Fig. 1. Fig. 7 is an enlarged perspective view of the eccentric for changing the position of the cut-off valve. Fig. 8 is a like view of the eccentric for changing the position of the main valve. Fig. 9 is a perspective view of the shaft, and Fig. 10 is a perspective view of the collar for actuating the cut-off valve eccentric.

The improved valve mechanism illustrated in Fig. 1 is applied to a cylinder A, in which reciprocates a piston B, and said cylinder is connected at its ends by ports $a\,b$ with a steam-chest C, connected with a suitable source of supply, and has a valve-seat C', on which moves the main valve D for controlling the passage of the motive agent from the steam-chest C to the cylinder A by way of the ports $a\,b$, and also for controlling the exhaust of the steam to the exhaust-port $c$. For the purpose mentioned the said main valve D is formed with annularly-arranged ports $d$, adapted to register with the ports $a\,b$, and on the inner face of said main valve D is formed an annular recess $e$ for connecting the ports $b\,a$ with the exhaust-port $c$ for the escape of the exhaust motive agent.

The main valve D is mounted at its center on an eccentric E, having its hub E' formed with a spiral groove $E^2$, engaged by a lug F' on a shaft F, formed with a square portion $F^2$, engaged by the correspondingly-shaped hub G' of a driving sprocket-wheel G, connected by a sprocket-chain $G^2$ with a sprocket-wheel on the engine-shaft, so that when the engine is in action a continuous rotary motion is given to the sprocket-wheel G and the shaft F to cause the eccentric E to move the main valve D over the face of the seat C' to control the inlet and exhaust of the motive agent, as above mentioned.

The hub G' is mounted to turn in suitable bearings in a bracket H, attached to the cover $C^3$ of the steam-chest C, so that the sprocket-wheel is held against longitudinal movement, but allows a longitudinal movement of the shaft F without moving the hub G' out of gear with the square portion $F^2$ of the said shaft.

On the outer face of the main valve D is fitted a cut-off valve I in the shape of a disk mounted on an eccentric J, having a hub J' fitted over the hub E' of the main eccentric E, said hub J' being mounted to turn in a stuffing-box $C^2$, carried by the steam-chest cover $C^3$, as is plainly illustrated in Fig. 1. On the outer end of the hub J' are formed oppositely-disposed spiral grooves $J^2$, engaged by lugs K' on the inside of a collar K, having diametrically opposite lugs $K^2$ loosely engaging longitudinal keyways $E^3$ on the hub E' of the main valve eccentric E. The collar K is also provided with an annular recess $K^3$, engaged by a ring L', secured to one face of a cut-off hand-wheel L, under the control of the operator, and formed in its hub with an internal thread screwing on a nut N, attached to the bracket H.

Now it will be seen that when the hand-wheel L is turned by the operator it screws inward or outward on the fixed nut N, according to the direction in which the said hand-wheel is turned. This movement of the hand-wheel L in an inward or outward direction causes a corresponding shifting of the collar K on the hub E' of the eccentric E, and at the same time the lugs K' of the collar K impart a turning motion to the hub J' and the eccentric J, owing to the lugs K' engaging the spiral grooves J² in the said hub J'. When the eccentric J is turned by the turning of the hand-wheel L, as described, it is evident that the cut-off valve I is shifted on the outer face of the main valve D, so as to cause the said cut-off valve to cut off the ports $d$ sooner or later relatively to the inlet-ports $a$ $b$.

In order to reverse the engine, it is necessary to impart a half-revolution to the eccentric E to shift the main valve D accordingly across the seat C', and for this purpose the outer end F³ of the shaft F is carried by the hub O' of a reversing hand-wheel O under the control of the operator and screwing on a nut O², attached to the bracket H. When the wheel O is turned to screw in an outward direction, then the shaft F is carried along, and the lug F' in engagement with the spiral groove E² in the hub E' imparts a half-revolution to the hub of the eccentric E, so as to shift the main valve D diametrically across the face C' for reversing the engine.

The outer face of the cut-off valve I is engaged by a balance-plate P, pressed by springs P' in contact with said cut-off valve, the springs abutting against the inner face of the steam-chest cover C⁸, from which the said plate is also supported by pins P², as indicated in Figs. 1 and 5. The cut-off balance-plate P is made ring-shaped and is connected at its inner edge by a flexible diaphragm P³ with the steam-chest cover C', said diaphragm being secured at its outer edge by a ring P⁴ to said balance-plate and by a similar ring P⁵ to the inner face of the steam-chest cover, as will be readily understood by reference to Figs. 1 and 5. By the arrangement described full compensation is had for all wear on the contacting faces of the seat C', the valves D and I, and the balance-plate P.

It is understood that when the engine is in operation the eccentric J is stationary, also the cut-off valve I, while the main valve D is shifted across the valve-seat C' by the action of the eccentric E and shaft F, of which the latter is driven from the main shaft of the engine, as above explained.

When it is desired to change the point of cut-off, the operator turns the hand-wheel L accordingly to cause the eccentric J to shift the cut-off valve I across the face of the main valve D. When it is desired to reverse the engine, the operator turns the hand-wheel O so as to move the shaft F outward without moving it out of gear with the sprocket-wheel G, but causing a half-revolution of the eccentric E to shift the main valve D diametrically across the seat C'.

Having thus fully described my invention, I claim as new and desire to secure by Letters Patent—

1. A valve mechanism, comprising a rotary main valve having annularly-arranged inlet-ports and an exhaust-recess, an eccentric for moving the main valve on its valve-seat, a cut-off valve over said main valve to regulate the admission of steam from the steam-chest to the inlet-ports, and an eccentric on which said cut-off valve is mounted, said cut-off-valve eccentric being under the control of the operator, to shift the cut-off valve over the face of the main valve to the desired point of cut-off, substantially as shown and described.

2. A valve mechanism, comprising a rotary main valve having annularly-arranged inlet-ports and an exhaust-recess, means for moving said valve on its valve-seat, a cut-off valve on said main valve, to regulate the admission of the motive agent from the steam-chest to the inlet-ports, an eccentric on which said cut-off valve is mounted, and means, substantially as described and under the control of the operator, for turning said eccentric to move the cut-off valve over the face of the main valve to the desired point of cut-off, as set forth.

3. A valve mechanism, comprising a rotary main valve having annularly-arranged inlet-ports and an exhaust-recess, means for moving said valve on its valve-seat, a cut-off valve on said main valve, to regulate the admission of the motive agent from the steam-chest to the inlet-ports, an eccentric on which said cut-off valve is mounted, and means, substantially as described and under the control of the operator, for turning said eccentric to move the cut-off valve over the face of the main valve to the desired point of cut-off, said means comprising a collar having two sets of lugs, one set for engaging a spiral groove on the hub of the eccentric, and the other set for engaging a longitudinal keyway on a part of the main valve, and a hand-wheel screwing on a fixed nut and engaging said collar, to move the latter longitudinally, as set forth.

4. A valve mechanism, comprising a rotary main valve having annularly-arranged inlet-ports and an exhaust-cavity, an eccentric for moving said main valve over its valve-seat and having a hub with a spiral groove, a shaft adapted to be driven from the engine-shaft and having a lug engaging said spiral groove in the eccentric-hub, a hand-wheel engaging said shaft, and a fixed nut on which screws said hand-wheel, to move said shaft longitudinally and to cause the lug thereof to turn said eccentric and move the main valve into a reversing position, as set forth.

5. A valve mechanism comprising a ring-shaped balance-plate, the steam-chest having a cover with a central portion of less diameter than the central aperture of the balance-plate, springs interposed between the outer portion of the balance-plate and the cover, and a flexible diaphragm extending outwardly from the central portion of the cover to the inner portion of the balance-plate.

In testimony whereof I have signed my name to this specification in the presence of two subscribing witnesses.

ISAAC LYNDE FITZ HUGH.

Witnesses:
M. F. FITZ HUGH,
ED. H. WARR.